United States Patent [19]
Kruger

[11] Patent Number: 4,726,343
[45] Date of Patent: Feb. 23, 1988

[54] SUCTION PIPE ARRANGEMENT FOR MULTI-CYLINDER INTERNAL COMBUSTION ENGINES WITH FUEL INJECTION NOZZLES

[75] Inventor: Herrmann Kruger, Wolfsburg, Fed. Rep. of Germany

[73] Assignee: Volkswagen AG, Fed. Rep. of Germany

[21] Appl. No.: 27,348

[22] Filed: Mar. 18, 1987

[30] Foreign Application Priority Data

Mar. 20, 1986 [DE] Fed. Rep. of Germany ....... 3609373

[51] Int. Cl.$^4$ .............................................. F02B 15/00
[52] U.S. Cl. .................................... 123/432; 123/308; 123/445; 123/472; 123/52 M
[58] Field of Search ................ 123/432, 308, 472, 470, 123/445, 52 M

[56] References Cited

U.S. PATENT DOCUMENTS

4,488,531 12/1984 Tadokoro et al. ................... 123/432

FOREIGN PATENT DOCUMENTS

| 0098543 | 1/1984 | European Pat. Off. . |
| 1576230 | 4/1970 | Fed. Rep. of Germany . |
| 3502699 | 8/1985 | Fed. Rep. of Germany . |
| 3519143 | 12/1985 | Fed. Rep. of Germany . |
| 201928 | 11/1984 | Japan ..................................... 123/432 |

*Primary Examiner*—E. Rollins Cross
*Attorney, Agent, or Firm*—Brumbaugh, Graves, Donohue & Raymond

[57] ABSTRACT

In order to avoid fuel injection nozzles with a control range extending over the entire load range of the engine, in an internal combustion engine equipped with two intake pipes per cylinder and wherein, furthermore, one intake manifold each supplies intake pipes optimized for low air throughput ranges for high air throughput ranges, there are provided in only one each of the intake pipes fuel injection nozzles each associated individually with one intake pipe, which nozzles are designed for the requirements in a low air throughput range while a fuel injection nozzle common to all cylinders is provided in the intake manifold associated with the other intake pipes.

5 Claims, 2 Drawing Figures

4,726,343

SUCTION PIPE ARRANGEMENT FOR MULTI-CYLINDER INTERNAL COMBUSTION ENGINES WITH FUEL INJECTION NOZZLES

BACKGROUND OF THE INVENTION

The invention concerns an intake pipe arrangement for a multi-cylinder internal combustion engine with fuel injection nozzles, whereby each cylinder of the engine is connected by way of a first intake pipe, which is designed for optimal filling in a low air throughput range, with a first intake manifold and by way of a second intake pipe designed with lower resistance with a second intake manifold, each of which intake manifolds is preceded by a throttle member. The throttle member of the first intake manifold opens already in the lower air throughput range whereas the throttle member of the second intake manifold additionally opens only in a higher air throughput range. In the intake pipe arrangement of this kind known from EP application No. 0 098 543, F02B 27/00, the long and thin first intake pipes which extend with a curvature of 180° open into the second intake pipes, which are relatively short and have a considerably larger flow cross section, ahead of the entry thereof into the cylinder block or cylinder head so that the second intake pipes in order to achieve the large flow cross section must be provided with relatively large cross dimensions. The successive intake ports in the cylinder block or cylinder head also requiring large cross dimensions. In this known engine, the injection nozzles are located, in the direction of flow, behind the point of discharge of the first intake 10 pipes in the intake ports. Due to the fact that only one intake nozzle is provided per cylinder and the two intake pipes are arranged coaxially in the vicinity of the intake valve, the intake valve, in order to attain a sufficient flow cross section, must be of very large size, which for reasons of space creates difficulties. The known internal combustion engine also suffers from the disadvantage that one fuel injection nozzle per cylinder must be controllable over the entire range of fuel requirements from idling to the highest load. This causes difficulties, in particular as concerns a precise fuel apportionment during idling, inasmuch as then injection pulses which are very short are needed and even the slightest tolerances lead to relatively large deviations between the actual quantity and the desired quantity of the apportioned fuel.

From DE-OS 15 76 230, F02B 27/00, for example, is also known a piston internal combustion engine whose two intake pipes, likewise dimensioned for optimal filling in various speed and load ranges, are connected by means of individual intake valves with the cylinders concerned. However, this publication does not contain any information on details, such as intake manifolds, arrangement of fuel injection nozzles and throttle organs serving as power control elements.

The intake device as per DE-OS 35 02 699, F02B 27/00, too, has two intake pipes per cylinder, which intake pipes by means of intake valves with possibly different control times, are in connection with the combustion chamber concerned. On the input side, both intake pipes which evidently are rendered identical, are associated with a device for adjustment of their length to the prevailing operating states. An injection nozzle is lodged in a cavity in the partition between the two intake pipes each of which is associated with one cylinder or said nozzle is provided individually in each intake pipe. By means of a throttle valve in one of the intake pipes it is obtained that the intake pipe opens only in a medium speed range. If one adheres to the separation of the two intake pipes, which is of advantage from the point of view of fluid mechanics, this construction requires a large effort in the form of injection nozzles due to the arrangement of individual fuel injection nozzles in each of the intake pipes.

With a view to rounding out the state of the art, reference is also made to DE-OS 35 19 143, F02D 9/02 which discloses a reciprocating-piston internal combustion engine with two identically shaped intake pipes and intake valves per cylinder. With each of the intake pipes of all the cylinders is associated a common intake line arrangement whereby in each intake line arrangement is placed a throttle valve. The throttle valves are actuated in sequence in the manner of a register. It is stated that if the engine in question operates with fuel injection, injection nozzles may be arranged either in the intake line arrangements (central injection) or in the intake pipes (single intake pipe injection). In the former case, idling difficulties may occur, in particular when the engine is cold, in that the fuel delivery takes place relatively far from the intake valves. Moreover, here, again, difficulties related to precise fuel quantity metering arise over the entire control range. The latter case is characterized by a large expenditure for injection nozzles.

SUMMARY OF THE INVENTION

It is an object of the invention to create an intake pipe arrangement of the type indicated above, which while retaining the advantages of intake pipes optimized for different air throughput ranges and avoiding the disadvantages of the known constructions described above, ensures at the smallest possible construction effort an optimal fuel apportioning over the entire performance range of the engine.

Pursuant to this object, and others which will become apparent hereafter, one aspect of the present invention resides in the first and the second intake pipes opening via individual intake valves into the cylinder, and in the first intake pipes are arranged individual injection nozzles whereas in the second intake manifold is arranged an injection nozzle which is common to the second intake pipe, which latter intake nozzle delivers fuel only on opening of the associated throttle member.

Further refinements of the present invention include the individual injection nozzles being designed solely for a maximum fuel requirement in the low air throughput range, and the second intake manifold being arranged on a higher level than the first intake manifold.

The invention is advantageously distinct from the air intake plant as per the European patent application, i.e., not only in that, as known in principle, with each of the two cylinder-individual intake pipes is associated an individual intake valve, but also in that only the first intake pipes, i.e., the pipes delivering in the lower air 10 throughput range, are equipped with individual injection nozzles whereas with the second intake pipes of all cylinders (or a defined cylinder group) is associated in the second intake manifolds, i.e., behind the throttle organ preceding the latter, a common fuel injection nozzle. This facilitates at a minimum effort for injection nozzles the advantageous design of the various injection nozzles as defined by the present invention. The injection nozzles being advantageously designed for the maximum fuel requirement in the low air throughput range.

Inasmuch as the common injection nozzle in the second intake manifold is relatively distant from the intake valves, the second intake manifold can be arranged on a higher level than the first one in order to achieve a drop or gravity for the fuel. Thereby are also rendered superfluous sharp curvatures of intake pipes such as required by the arrangement of the two intake distributors on the same level in the construction as per the European patent application.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

An example of an embodiment of the invention will be described below with reference to the drawing.

FIG. 1 depicts a perpendicular cross-sectional arrangement pursuant to the present invention, whereas

DETAILED DESCRIPTION OF THE PREFERRED EMBODIMENTS

Figure 1:
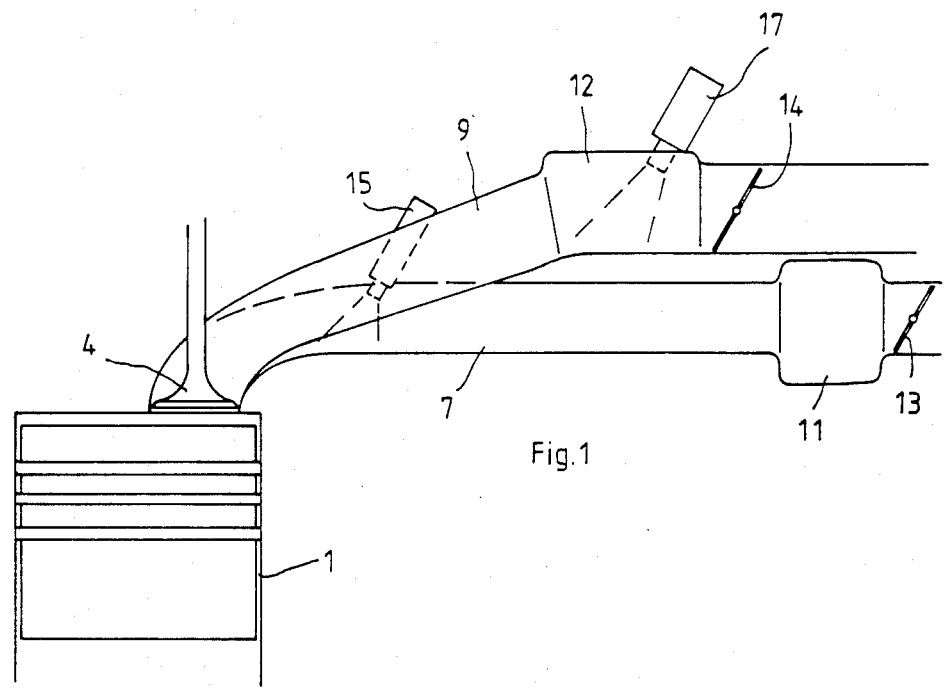
Figure 2:
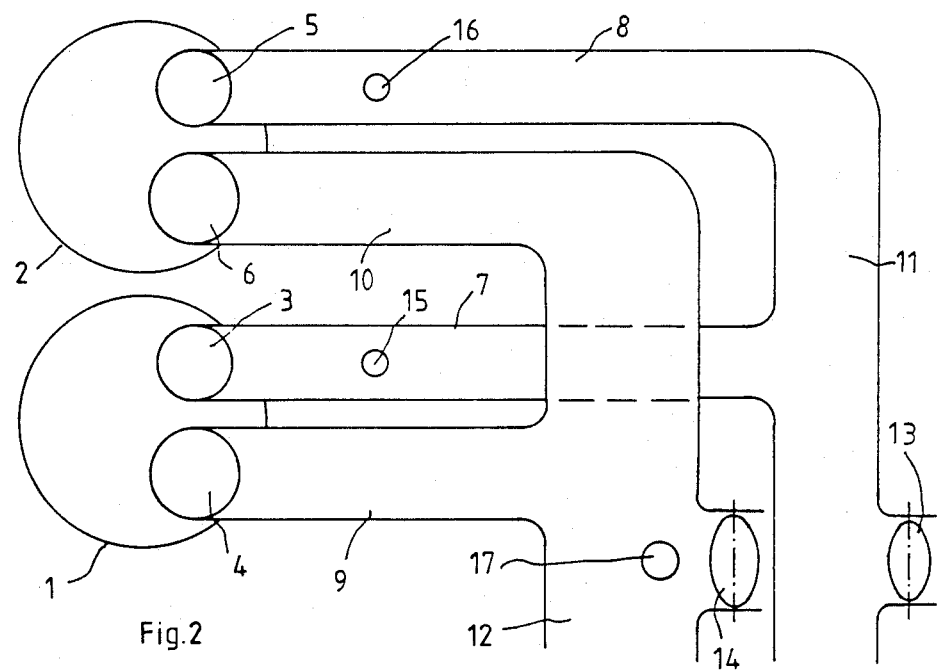
FIG. 2 is a plan view of the arrangement in FIG. 1.

In the figures appear only cylinders -1- and -2- of an internal combustion engine which may contain any desired number of cylinders and is to serve as engine propelling an automobile. Each cylinder is provided with first and second intake valves -3-, -5- and, respectively, -4-, -6- which via first intake pipes -7-, -8- and, respectively, second intake pipes -9-, -10- are in communication with a first and second intake manifold, -11- and, respectively, -12-, common to all cylinders. Each of the intake manifolds is preceded by a throttle valve -13- and -14-, respectively, acting as a power control element. The actuation of the throttle valves is effected in such a manner that throttle valve -13- is open already in a low air throughput range whereas the second throttle valve -14- is opened in the manner of a register only in a medium air throughput range.

The figures show clearly that the first intake pipes -7- and -8- are relatively long and have a small flow cross section whereas the second intake pipes -9- and -10- are relatively short and are designed with a larger flow cross section. Thus, the first intake pipes are optimized for operation at low speeds whereas the second intake pipes are designed with a view to a small flow resistance at a high air throughput.

In the first intake pipes -7- and -8- are arranged individual fuel injection nozzles -15- and -16 which are designed for the fuel requirement in the low-speed and, respectively, low-load range. Accordingly, their control range is relatively small in that it extends merely from an idling requirement to a requirement at partial load. The additional requirement at larger air throughput rates is covered by the fuel injection nozzle -17- common to all second intake pipes -9- and -10- in the second intake manifold -12-, i.e., behind the associated throttle valve -14-. This common injection nozzle -17- thus is actuated in such a manner that starting at the earliest on opening of the throttle valve -14-, i.e., e.g., for full load enrichment, it delivers fuel and does so in addition to the injection nozzles -15- and -16- individual to the respective intake pipes.

Inasmuch as the distance between the common injection nozzle -17- and the associated intake valves -4- and -6- is larger than the distance between the injection nozzles -15- and -16-, individual to the respective intake pipes, and the associated intake valves -3- and -5-, the intake pipe arrangement has been conceived in such a manner that the second intake manifold -12- is placed on a higher level than the first intake manifold -11-, i.e., above the first intake pipes -7- and -8-. As a result of this multi-level arrangement pronounced curvatures of the intake pipes are avoided, too, while in spite of this, the space requirement of the intake pipe arrangement is small.

While the invention has been illustrated and described as embodied in an intake pipe arrangement for multi-cylinder internal combustion engines with fuel injection nozzles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. An improved intake pipe arrangement for a multi-cylinder internal combustion engine with fuel injection nozzles, whereby each cylinder is connected by way of a first intake pipe, which is designed for optimal filling in a low air throughput range, with a first intake manifold and by way of a second intake pipe designed with a lower resistance with a second intake manifold, each of the intake manifolds being preceded by a throttle member, the throttle member of the first intake manifold opening already in the low air throughput range where as the throttle member of the second intake manifold additionally opens only in a higher air throughput range, the improvement comprising: the first and second intake pipes being provided so as to open, via individual intake valves, into the cylinder; individual injection nozzles are arranged in the first intake pipes; and a common injection nozzle is arranged in the second intake manifold so as to be common to the second intake pipes, said common injection nozzle member being provided so as to deliver fuel only on opening of its associated throttle member.

2. An intake pipe as defined in claim 1, wherein the individual injection nozzles are designed solely for a maximum fuel requirement in the low air throughput range.

3. An intake pipe as defined in claims 1 or 2, wherein the second intake manifold is arranged on a higher level than the first intake manifold.

4. An intake pipe arrangement for a multi-cylinder internal combustion engine with fuel injection nozzles, comprising:
a first intake manifold;
a plurality of first intake pipes provided so as to connect each cylinder of the engine with said first intake manifold, said first intake pipes being designed for optimal filling in a low air throughput range;

a second intake manifold;

a plurality of second intake pipes provided so as to connect each cylinder of the engine with said second intake manifold, said second intake pipes being designed with a lower resistance;

a first throttle member provided so as to precede said first intake manifold and open in the low air throughput range;

a second throttle member provided so as to precede said second intake manifold and open only in a higher air throughput range then said first throttle member;

a plurality of intake valves provided so as to individually correspond with said first and said second intake pipes so that each of said intake pipes opens into its respective cylinder;

a plurality of first injection nozzles individually arranged in said first intake pipes; and a second injection nozzle provided in said second intake manifold so as to be arranged common to all of said second intake pipes, said second injection nozzle being provided so as to deliver fuel only upon opening of said second throttle member.

5. An intake pipe arrangement as defined in claim 4, wherein said first intake manifold is provided at a first elevation, and said second intake manifold is provided at a second elevation higher than said first elevation.

* * * * *